United States Patent [19]
Berry

[11] Patent Number: 6,138,338
[45] Date of Patent: Oct. 31, 2000

[54] METHOD FOR FORMING A WIND CHANNEL SEAL INSERT WITH A BELT-LINE EXTENSION

[75] Inventor: David Harold Berry, Maryville, Tenn.

[73] Assignee: Schlegel Corporation, Rochester, N.Y.

[21] Appl. No.: 09/187,463

[22] Filed: Nov. 4, 1998

Related U.S. Application Data

[62] Division of application No. 08/799,433, Feb. 13, 1997.

[51] Int. Cl.$^7$ .................................................. B29D 31/00
[52] U.S. Cl. ............................................. 29/415; 264/152
[58] Field of Search .............................. 49/502, 377, 440,
49/479.1, 475.1; 264/152, 148; 277/917,
921; 29/415, 417, 888.3, 418, 527.1

[56] References Cited

U.S. PATENT DOCUMENTS

| | | |
|---|---|---|
| 3,250,040 | 5/1966 | Squires . |
| 3,399,448 | 9/1968 | Jackson ..................................... 29/415 |
| 3,490,139 | 1/1970 | McKinven ............................. 29/527.1 |
| 3,788,008 | 1/1974 | Yackiw ..................................... 49/377 |
| 4,817,336 | 4/1989 | Kisanuki . |
| 4,894,954 | 1/1990 | Nozaki et al. . |
| 4,908,989 | 3/1990 | Omura et al. . |
| 5,010,689 | 4/1991 | Vaughan . |
| 5,127,193 | 7/1992 | Okada ..................................... 264/152 |
| 5,317,835 | 6/1994 | Dupuy et al. . |
| 5,343,609 | 9/1994 | McManus . |
| 5,396,733 | 3/1995 | Dupuy . |
| 5,694,718 | 12/1997 | Norton . |

FOREIGN PATENT DOCUMENTS

0 403 854   12/1990   European Pat. Off. .

*Primary Examiner*—S. Thomas Hughes
*Assistant Examiner*—Anthony L. Green
*Attorney, Agent, or Firm*—Harter, Secrest & Emery LLP; Stephen B. Salai

[57] ABSTRACT

A method for manufacturing a resilient sealing insert with a belt-line extension for a door and window flush glass channel seal is described. The generally U-shaped channel insert includes a base, a first leg and a second leg which is attached to the base along a tearable line of weakness. The legs are separated from the insert into a window run channel portion and an integral belt-line extension.

3 Claims, 6 Drawing Sheets

METHOD FOR FORMING A WIND CHANNEL SEAL INSERT WITH A BELT-LINE EXTENSION

This application is a division of co-pending U.S. patent application Ser. No. 08/799,433, Flush Glass Seal Insert with a Belt-Line Extension, filed Feb. 13, 1997.

FIELD OF THE INVENTION

This invention relates generally to motor vehicle door and window flush glass channel seals and more particularly to a resilient sealing insert for the window channel seal having a tearable line of weakness for separating the insert into a window run channel portion and an integral belt-line extension, and to a method of forming a window channel seal insert having an integral belt-line seal extension.

BACKGROUND OF THE INVENTION

The motor vehicle industry, particularly the passenger car and van portions of the industry, are increasingly relying on flush glass window mounting for improving the appearance of motor vehicles and reducing the aerodynamic drag of the vehicles to make them more fuel efficient. A flush glass seal mounts to a door or window opening of a motor vehicle to engage three sides of a movable window glass. The fourth side of the window glass that remains within the door or body of the vehicle is sealed by a separate belt-line seal usually mounted thereon. Separate belt-line seals leave gaps where the window seal and the belt-line seal meet which are a source of leaks and permit excessive window rattle and allow road noise to penetrate the interior of the vehicle.

Thermosetting materials such as ethylene-propylene-diene-monomer rubber (EPDM) have been used extensively for vehicle window seals and belt-line seals. Some complex seals have included portions formed from other materials such as thermoplastic materials, but EPDM has usually been a major portion of these seals. To improve the appearance of motor vehicles, the industry demands window seals that are colored to enhance the appearance of the vehicle, usually by matching the body color. Obtaining a color on EPDM has been less than satisfactory in the past, whereas thermoplastics are readily colored. Although EPDM is cost effective (inexpensive) as a material, the total cost of making and installing an EPDM seal on a motor vehicle is high. The seal must not only be formed at the radii of the glass by cutting, mitering or welding molded pieces, but it must also be arched in the vertical direction to coincide with the curved glass and rounded sides of the vehicle. To accomplish this with EPDM, a metal support internal to the EPDM is added, usually as the EPDM seal is extruded. Massive and expensive roll forming machinery and tooling, and stretch bending equipment and tooling are required to form the extruded seal to the desired configuration in three dimensions. Thus, the total cost, that is the cost of the seal and the capital cost of equipment needed to form it, is high.

U.S. Pat. No. 5,343,609 describes improved vehicle door or window channel seals that overcome the disadvantages of EPDM seals. The seals have two members, a substantially rigid first carrier member thermally formed from a hard, rigid or semi-rigid plastic and a soft plastic, and a second sealing member made from resilient material, preferably rubber. The first sealing member comprises a dual durometer, thermoplastic elastomer (TPE) which attaches to the vehicle body and can be color matched to an automobile. The first member is thermally formed by extrusion or molding in one piece and immediately conformed to the contour of the vehicle opening. Thus molded joint lines and the need for cutting, mitering or welding of the carrier member to fit the corners are avoided. The second sealing member can be formed by extrusion of a one piece, relatively flat, rubber insert which can be readily provided with a sliding surface, such as a slip coating or flocking. A separate belt-line seal is required when this two-piece seal is used as a door window channel seal.

It is an object of this invention to provide a resilient sealing insert for a TPE flush glass window channel seal having a channel sealing portion integral with a belt-line extension.

It is an object of this invention to provide a resilient insert for a flush glass window seal, the resilient insert having a tearable line of weakness for separating the insert into a window run channel portion and an integral belt-line extension.

It is an object of this invention to provide a method of forming a one-piece window run channel insert having an integral belt-line extension.

SUMMARY OF THE INVENTION

In accordance with a presently preferred embodiment of the invention there is provided a U-shaped window channel seal insert comprising, a base having a first and a second end; a first leg attached to the first end of the base; a first sealing lip attached to the first leg; a second leg attached to the second end of the base, a line of weakness in the base adjacent the second leg for permitting the second leg to be separated from the base along the line of weakness, the second leg including an anchoring head adjacent the line of weakness; and a second sealing lip attached to the second leg.

In accordance with another aspect of the invention there is provided a combination window channel seal and belt-line seal extension including a generally U-shaped, resilient, window channel insert portion for engaging three sides of a movable window glass, the insert portion defined by a base having first and second ends, a first leg attached to the first end of the base, a first sealing lip attached to the first leg, a second leg attached to the second end of the base, a line of weakness in the base adjacent the second leg for permitting the second leg to be separated from the base along the line of weakness, the second leg including an anchoring head adjacent the line of weakness, and a second sealing lip attached to the second leg; and a belt-line extension portion for engaging a fourth side of the window glass, the belt-line extension portion defined by a first integral length of the second leg separated from the base at the line of weakness and extending generally at right angles from a first end of the insert portion, the first integral length having a first distal end, and a second length of the second leg separated from the base at the line of weakness and extending generally at right angles from a second end of the insert portion, the second integral length having a second distal end, wherein the first and second distal ends are joined together.

In accordance with another aspect of the invention there is provided a method for forming a combination window channel seal insert with a belt-line seal extension including the steps of extruding a generally flat, resilient insert defined by a base having first and second ends, a first leg attached to the first end of the base, a first sealing lip attached to the first leg, a second leg attached to the second end of the base, a line of weakness in the base adjacent the second leg for permitting the second leg to be separated from the base along the line of weakness, the second leg including an anchoring head adjacent the line of weakness, and a second sealing lip attached to the second leg; cutting the extruded insert into a strip of a selected length; tearing away a first length of the second leg from a first portion of the base starting at an end of the strip; tearing away a second length of the second leg from a second portion of the base starting at an opposite end of the strip; and joining a distal end of the first length to a distal end of the second length to form the belt-line extension of the insert.

The novel aspects of the invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Figure 1:
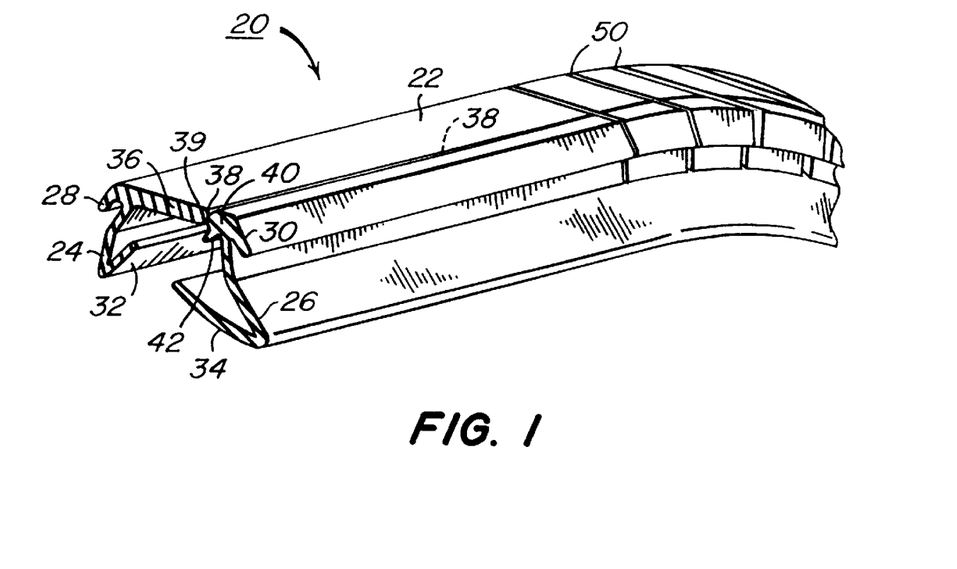
FIG. 1 is a perspective view of the window channel insert.

A resilient sealing insert for a motor vehicle door and window flush glass channel sealing system in accordance with this invention is illustrated in FIG. 1. The generally U-shaped channel insert 20 is preferably extruded in strips which are then cut to size and formed into a desired configuration for installation in a window run channel seal carrier portion of the flush glass seal. The U-shaped insert 20 has a base 22 and first and second legs 24, 26 respectively. The base 22 has two anchoring lobes 28, 30 for attaching to the window run channel carrier portion. Sealing lips 32, 34 attached to the first and second legs respectively provide a seal with a movable window passing between the lips. A tearable line of weakness 38 is preferably made by forming a relatively thin section 39 at an end 36 of the base 22. Preferably the thick areas of the base are from about 2 to 5 mm thick and the thin areas have a thickness of from 20–80% of the thick areas, preferably about 50%. In a typical embodiment the thick areas are 2–3 mm thick and the thin areas are 1–1.5 mm thick. Other methods of forming a tearable line of weakness known to the art are also contemplated by the invention, for example, perforating or slitting a length of the base.

The end of the second leg attached to the end 36 of the base 22 is in the form of a generally T-shaped anchoring head 40. The anchoring head 40 includes an anchoring projection 42 and the anchoring lobe 30. After separating the second leg 26 from the base 22 by tearing along the line of weakness 38, the anchoring projection 42 and the anchoring lobe 30 secure the anchoring head 40 in a groove 138 of a belt-line seal carrier 82 (see FIG. 7).

The channel insert 20, which is preferably but not necessarily manufactured in an open, relatively flat configuration, is bent at its corners and inserted into a window run channel carrier portion of a flush glass window seal. To aid fitting of the insert 20, it can be provided with multiple slits 50 across its width, or it can be punched out at the corners. Preferably, the insert 20 is formed by extrusion of an EPDM rubber. This rubber extrusion can be readily provided with either a slip coating or flocking on the surfaces of the sealing lips 32, 34 and the base 22 that come into contact with the glass.

Figure 2:
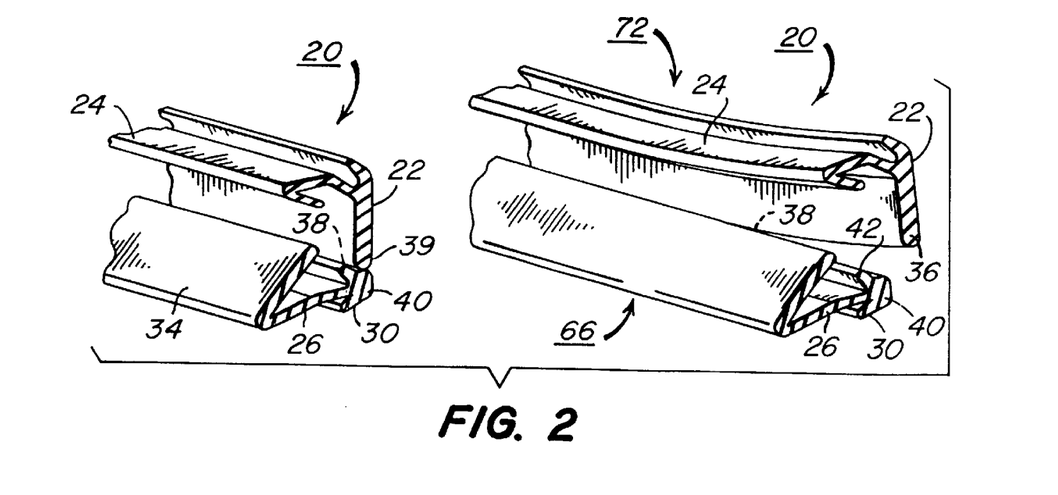
FIG. 2 illustrates the tearable section of the channel insert.
Figure 3:
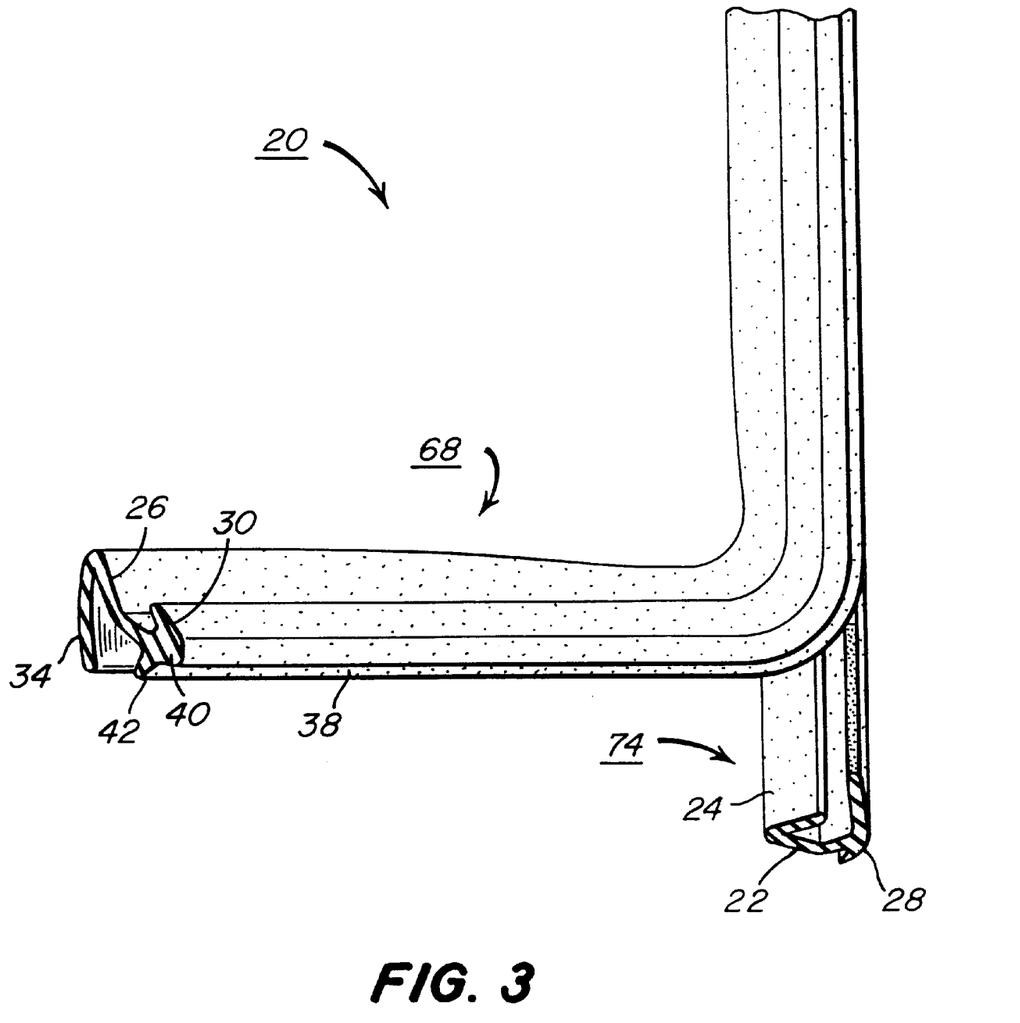
FIG. 3 is a perspective view of a torn away section of the channel insert.

Referring now to FIG. 2 there is illustrated a perspective view of the channel insert 20 showing how the insert 20 is separated at the tearable line of weakness 38 into a length 66 of the second leg 26 and a length 72 of the first leg 24 and base 22. Referring now to FIG. 3 there is illustrated another perspective view of the channel insert 20 showing how the insert 20 is separated at the tearable line of weakness 38 into a length 68 of the second leg 26 and a length 74 of the first leg 24 and base 24. The anchoring head 40 with anchoring lobe 30 and anchoring projection 42 can be fitted into a groove of a belt-line seal so that the second leg 26 and sealing lip 34 can form a belt-line extension for sealing with a sliding window.

Figure 4:
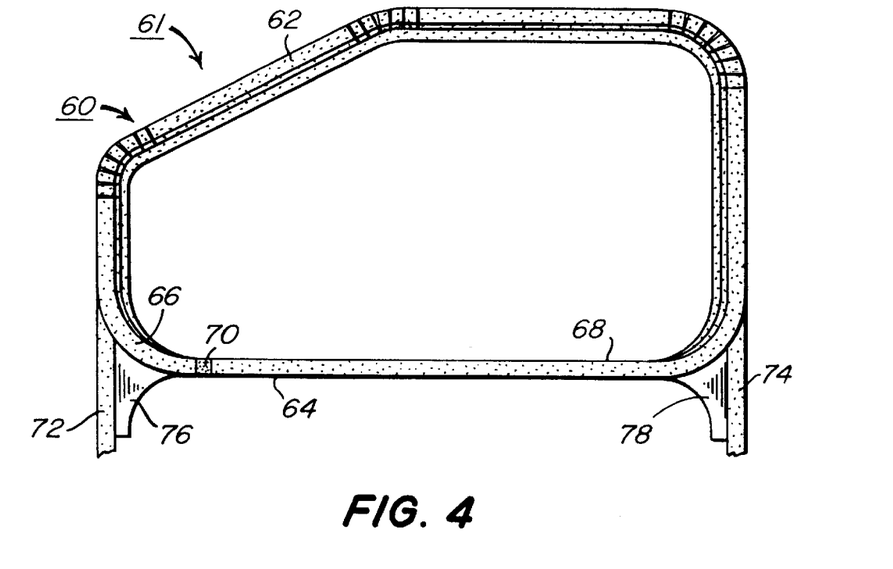
FIG. 4 is a face view of a one-piece channel insert with a belt-line extension.

Referring now to FIG. 4 there is illustrated a one-piece channel insert and belt-line extension 60 for a motor vehicle door formed with a window channel portion 62 which engages three sides of a movable window glass and a belt-line portion 64 which contacts the fourth side of the window glass which remains within the door. The window channel portion 62 is formed from a strip 61 of the insert, such as insert 20, and the belt-line portion 64 is formed by separating lengths 66, 68 of the second leg 26 from the base 22 along the line of weakness 38 at opposite ends of the strip 61. The distal ends of the lengths 66, 68 are joined to form joint 70. The position of joint 70 along the belt-line extension can vary depending on the lengths of lengths 66, 68, 72 and 74 required. The corresponding separated lengths 72, 74, respectively, of the first leg 24 and base 22 can form glass run channel extensions within the vehicle door.

In a preferred embodiment of the one-piece channel insert and belt-line extension 60, triangular-shaped rubber fillets 76, 78 are molded between the first leg/base lengths 72, 74 and the corresponding second leg lengths 66, 68 to align the belt-line and channel seal portions of the insert at a suitable angle, preferably a right angle, and to provide stability to the seal.

Figure 5:
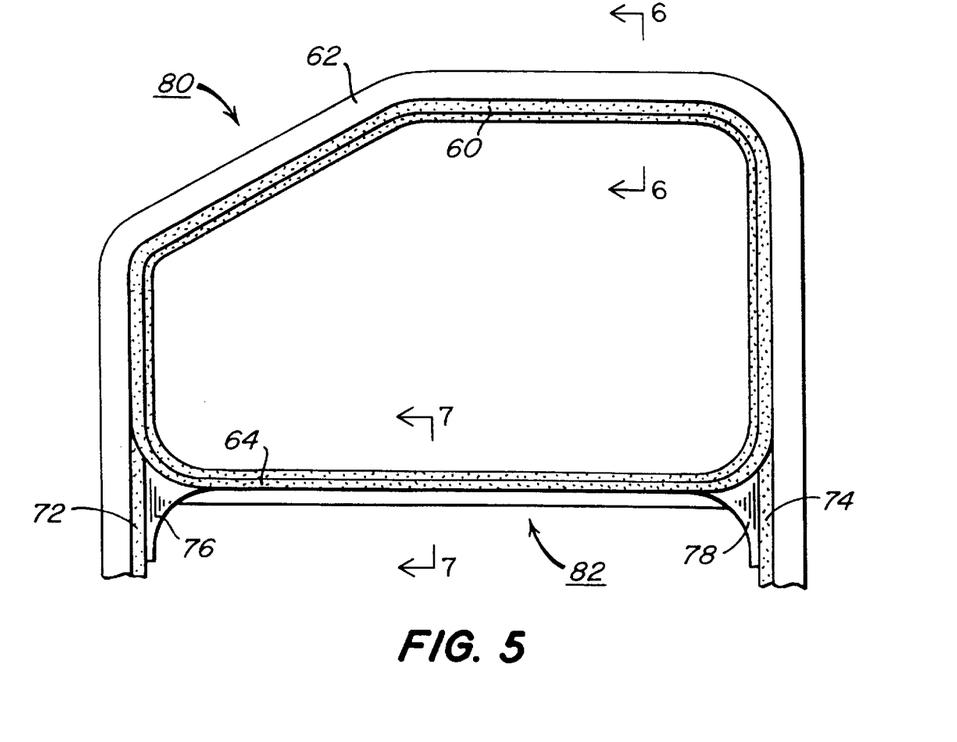
FIG. 5 is a schematic sectional view of a door window flush glass seal and channel insert with a belt-line extension.

Referring now to FIG. 5 there is shown a sectional view of a door and window channel flush glass seal 80 and belt-line seal 82. The one-piece channel insert and belt-line extension 60 formed from the window channel portion 62 and the belt-line portion 64 is mounted in the corresponding channel and groove of the flush glass seal and belt-line seal carrier portions respectively, both of which are mounted in the door window frame.

Figure 6:
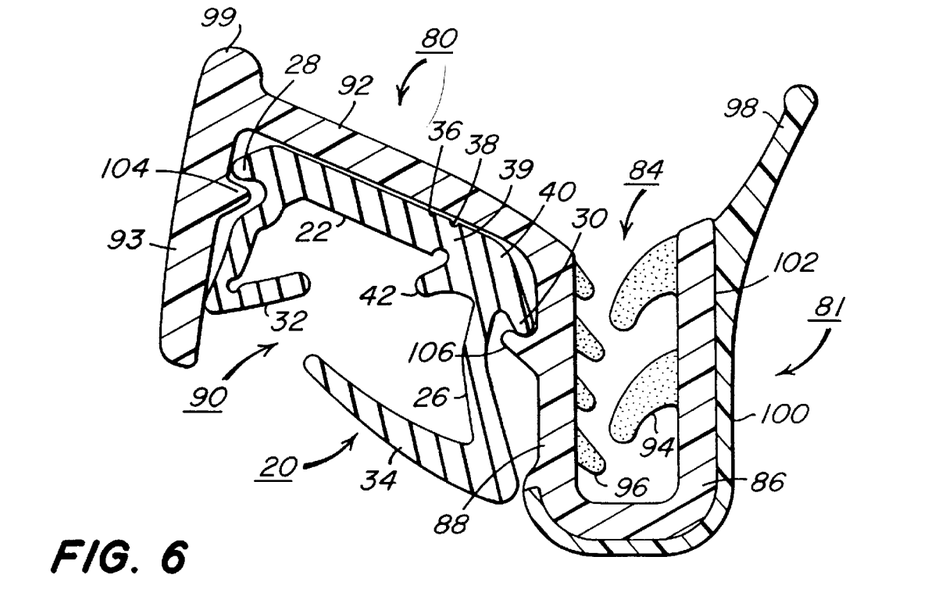
FIG. 6 is a cross section of the flush glass seal and channel insert.

Referring to FIG. 6 there is shown a cross section of the window channel flush glass seal 80 with the window engaging, resilient, channel sealing insert 20 locked in place. The channel seal 80 has a generally U-shaped body member 81 adapted to engage a flange surrounding the window opening of the motor vehicle door. The body member 81 has a flange engaging U-shaped first channel 84 formed between an outer leg 86 and an inner leg 88. The inner leg 88 forms a portion of the broader inverted U-shaped window run channel 90. Window run channel 90 is defined by a base 92, inner leg 88 and a third leg 93. The base 92 of the inverted U-shaped window run channel portion of the seal and legs 88 and 93 are substantially rigid. In addition, the flange engaging U-shaped channel 84 is preferably provided with one or more soft gripping projections 94 and 96 for firmly securing the seal to the door frame. An inwardly extending projection 98 of the coating 100 on the surface 102 of the U-shaped body member 81 of the channel seal 80 which faces the interior of the vehicle forms another seal to the vehicle body. A sealing projection 99 extends upwards from the third leg 93 and provides a neat appearance with the door frame. The legs 93, 88 of the window run channel 90 have inwardly depending locking extensions 104, 106 for engaging the anchoring lobes 28, 30 respectively of insert 20.

The generally U-shaped channel insert 20 is mechanically mounted in the window run channel 90. The insert 20 has a base 22 and first and second legs 24, 26 respectively. The base 22 has two anchoring lobes 28, 30 for locking with window run channel projections 104 and 106. Sealing lips 32, 34 attached to the first and second legs respectively provide a seal with a movable window passing between the lips. A tearable line of weakness 38 is made by forming a relatively thin section 39 in base 22. The end of the second leg attached to the end 36 of the base 22 is in the form of a generally T-shaped anchoring head 40. The head 40 includes an anchoring projection 42 and the anchoring lobe 30. The projection 42 and the lobe 30 are used to secure the head 40 in a groove 138 of a belt-line seal carrier 82 (see FIG. 7) after separating the second leg 26 from the base 22 by tearing along the line of weakness 38.

Figure 7:
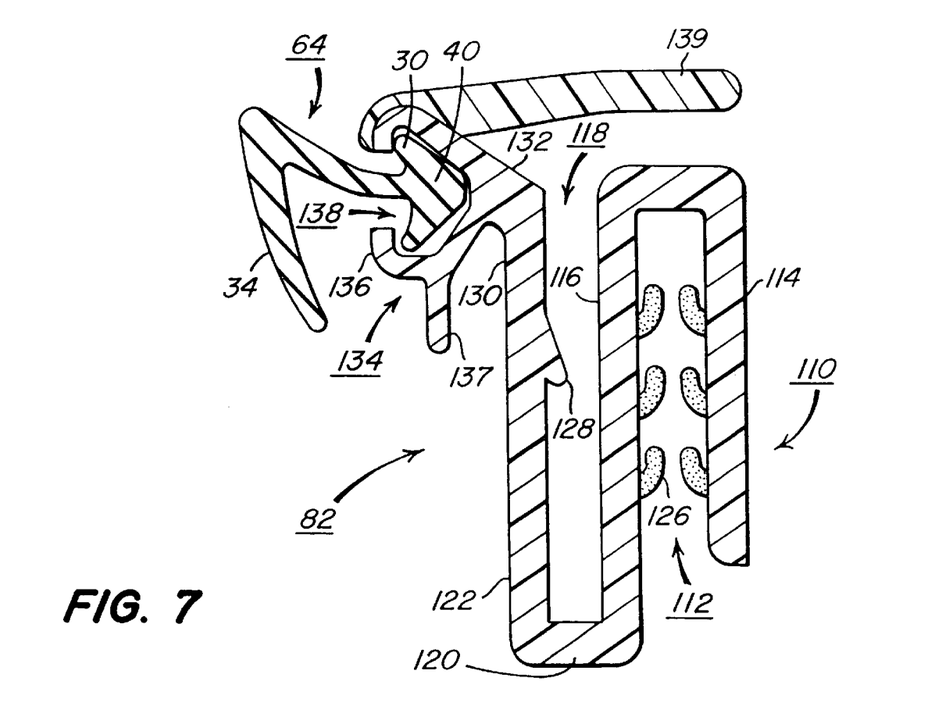
FIG. 7 is a cross section of the belt-line carrier and a belt-line extension.

Referring to FIG. 7 there is shown a cross section of a belt-line seal carrier 82 with the belt-line extension 64 in place. The belt-line seal carrier 82 has a generally inverted U-shaped body member 110 adapted to engage a flange along the body of the door. The body member 110 has a flange engaging inverted U-shaped channel 112 formed between an outer leg 114 and an inner leg 116. The inner leg 116 forms a portion of a U-shaped channel 118 having a base 120 and a third leg 122, the channel 118 holding a trim panel. The flange engaging channel 112 is preferably provided with one or more soft gripping projections 126 for firmly securing the body member 110 to the door frame. The leg 122 has one or more inwardly depending locking extensions 128 for engaging the trim panel. The end 130 of the third leg 122 of the U-shaped channel 118 is provided with a projecting arm 132. A generally Y-shaped projection 134 extends downwardly from the projecting arm 132. The projecting arm 132 and a curved limb 136 of the Y-shaped projection form a groove 138 for receiving and securing the anchoring head 40 of the belt-line extension. The arm 132 and Y-shaped projection 134 are flexible enough to be deflected by pressing projection 137 when the belt-line extension is inserted, thus enabling the insertion. A trim projection 139 on the arm 132 covers the carrier 82.

Figure 8:
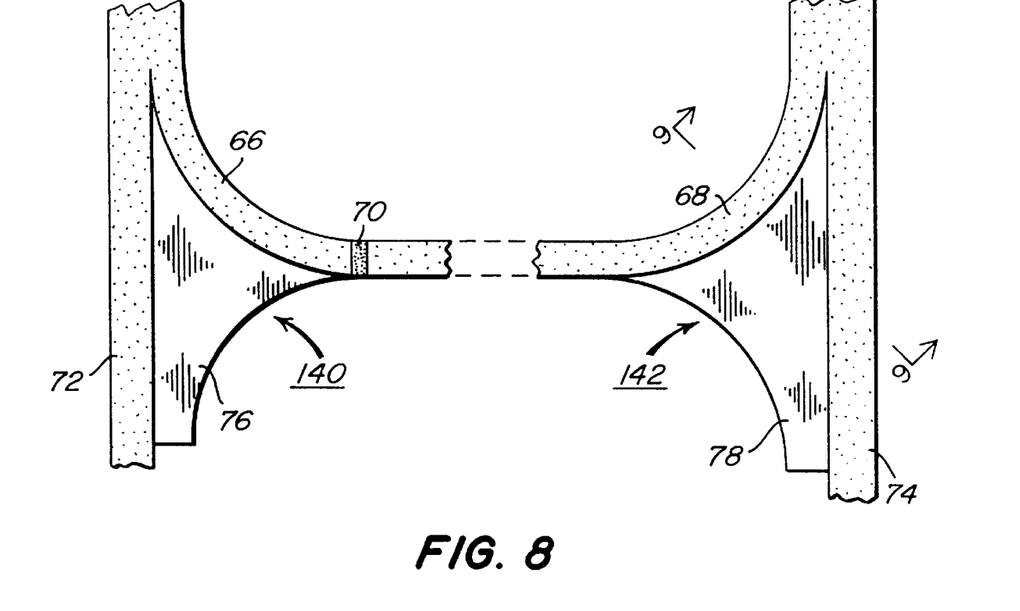
FIG. 8 is a face view of the rubber fillet at the junction with the belt-line extension.

Referring now to FIG. 8, there is shown a sectional view of the interfaces 140, 142 between the belt line extensions 66, 68 and the channel run extensions 72, 74 respectively. A butt joint 70 is formed at the junction between the distal ends of the extensions, thus completing the one-piece construction. In order to strengthen and support the one-piece seal, triangular-shaped rubber fillets 76, 78 are molded between each of the interfaces.

Figure 9:
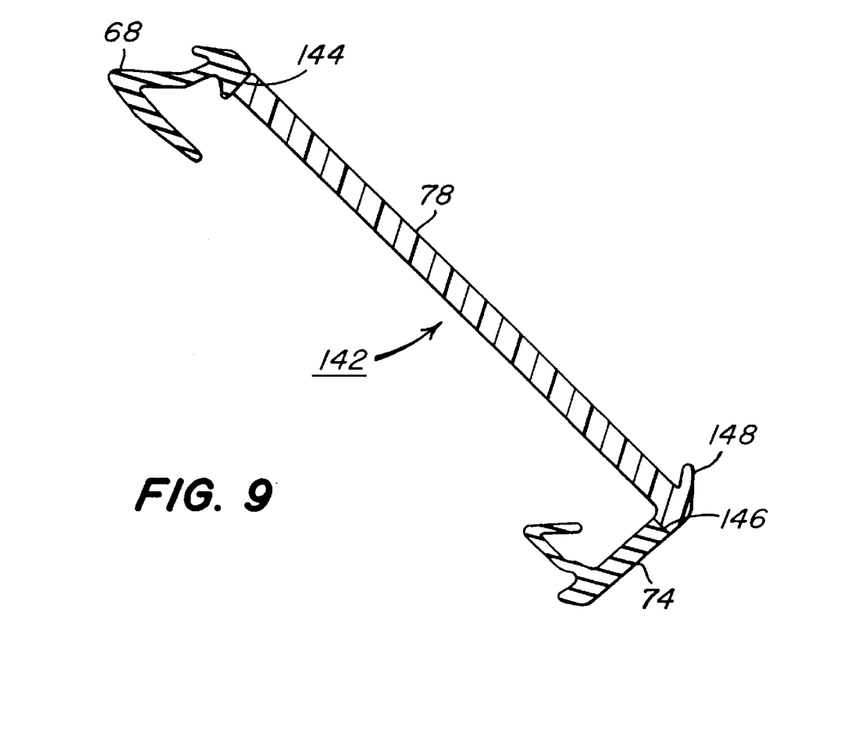
FIG. 9 is a cross section of the rubber fillet at the junction with the belt-line extension.

Referring to FIG. 9, there is illustrated a cross section of the interface 142 between the belt-line extension 68, the fillet 78 and the channel run extension 74 showing the profiles of the separated portions of the channel insert. Vulcanized joints 144, 146 are formed between the fillet 142 and the lengths 68 and 74 respectively. A projection 148 on the fillet anchors the fillet to a door run channel.

Figure 10:
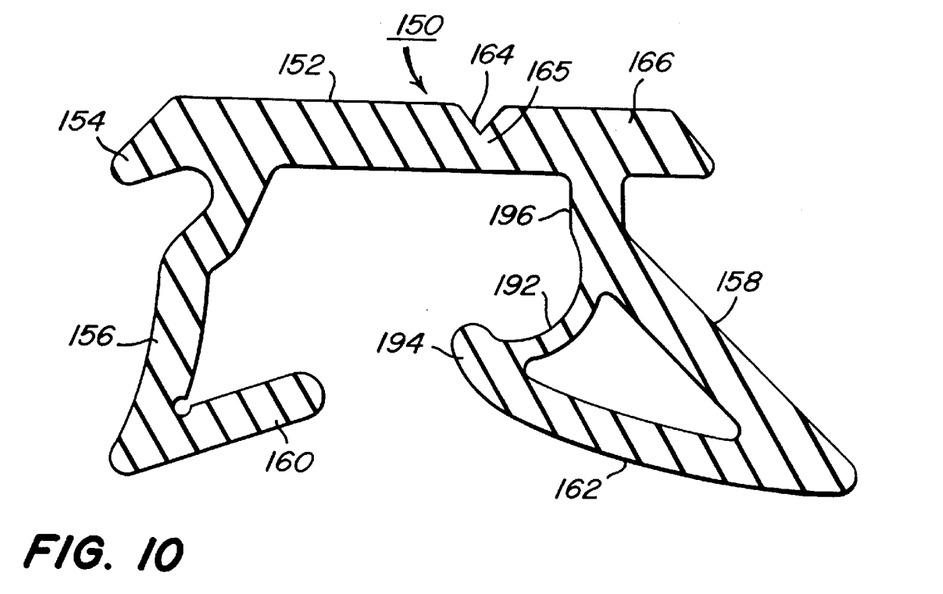
FIG. 10 is a cross section of a flush glass seal channel insert.
Figure 11:
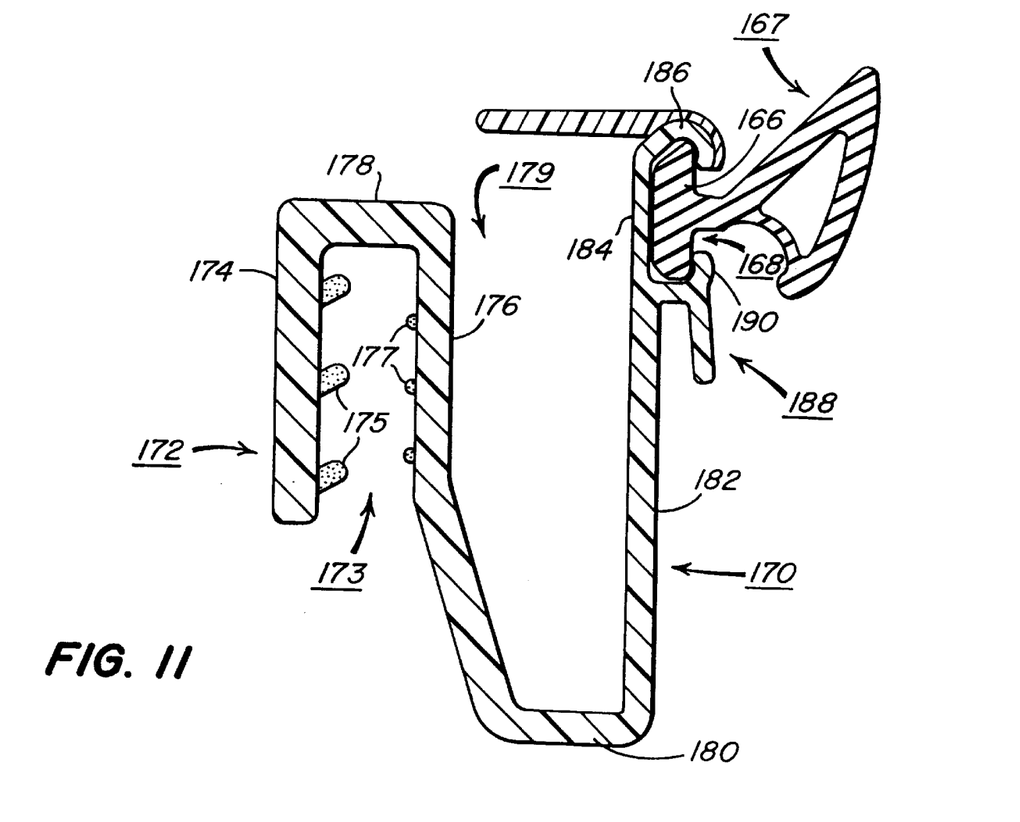
FIG. 11 is a cross section of a belt-line carrier and belt-line extension.

Referring now to FIGS. 10 and 11, preferred embodiments of the flush glass seal insert and the belt-line carrier are shown. The insert 150 is generally similar to the insert 20 of FIG. 6 having a base 152, anchoring lobe 154, first and second legs 156, 158, first and second sealing lips 160, 162 and having a tearable line of weakness 164 made by forming a relatively thin section 165 in the base 152. The insert 150 has a modified T-shaped anchoring head 166 at one end of the leg 158 adjacent the line of weakness 164 in the base 152. Tearing back along the line of weakness 164 provides a belt-line extension 167 (FIG. 11) with a T-shaped anchoring head which permits ready insertion of the belt-line extension into a groove 168 of a modified belt-line carrier 170. The belt-line seal carrier 170 is similar to the carrier 82 of FIG. 7 having a an inverted U-shaped body member 172 having a channel 173 formed by an outer leg 174, an inner leg 176 and a base 178. The flange engaging channel 173 is preferably provided with one or more soft gripping projections 175, 177 for firmly securing the body member 172 to the door frame. The inner leg 176 forms a portion of a U-shaped channel 179 having a base 180 and a third leg 182. The end 184 of the third leg 182 is a modified G-shape which readily accepts the T-shaped anchoring head 166 of the belt-line extension 167. The end 184 is provided with a curved tip 186 and a projection 188 having a curved limb 190 for locking with the anchoring head 166. The projection 188 is flexible enough to be deflected by pressing on it when the belt-line extension is inserted thus enabling the insertion. In addition, the insert is preferably provided with a resilient, web strip 192 attached between a distal end 194 of the second sealing lip 162 and an end 196 of the second leg 158 adjacent the anchoring head 166. The strip 192 supports the sealing lip 162 and biases the sealing lip 162 against a sliding window glass.

The window channel seal 80 is preferably formed from an extruded profile containing three different polymers, coming together into one profile. In one embodiment of the seal a semi-rigid thermoplastic elastomer (TPE) material forms the structural shape of the profile; a flexible TPE is colored to match the automobile's interior color scheme, and finally an elastic TPE is extruded for the gripping extensions. An extruded EPDM rubber sealing insert of the invention is snapped into the glass run channel of the TPE profile. The rubber extrusion can either have slip coating or flocking on the surfaces that come into contact with the glass. The soft TPE seals the static sealing area, while the EPDM rubber seals the dynamic area.

The resilient insert of the invention can be formed from a rubber, for example, natural rubber, styrene-butadiene rubber (SBR), ethylene-propylene rubber (EPR) or ethylene-propylene-diene-monomer (EPDM) rubber. EPDM is preferred and exhibits good compression set, durability and resistance to weathering.

The molded fillet of the invention is preferably made from a vulcanized rubber which is readily molded to the EPDM extrusion.

In a typical window channel seal, the semi-rigid TPE forms the generally U-shaped frame comprising the legs 86, 88, 93, and base 92. An elastic TPE forms the projections 94, 96. A second flexible strip forms the projection 98 and interior facing surface 100 of the channel seal. The interior facing surface 100 can be colored to match the interior of the vehicle. Material for projection 99 is preferably an elastic TPE.

The TPE portions of the carrier can be formed from a number of different plastic materials, for example, thermoplastics and thermoplastic elastomers (TPEs). TPEs are commercially available in several different brands and types. Each type can be obtained in different grades having different properties such as, hardness, tensile strength, compression, elongation, thermal stability and colorability. Selection of the appropriate TPE for a particular application depends on a suitable combination of such properties. Types of TPEs which are particularly useful for the channel seal are the styrenic block copolymers, rubber-polyolefin blends, elastomeric alloys, thermoplastic alloys, thermoplastic elastomeric alloys, thermoplastic ionomers, thermoplastic polyurethanes, polyvinyl chlorides and blends thereof.

The substantially rigid plastic portion of the channel seal is preferably formed from a rigid or semi-rigid TPE. A rigid TPE, for example a polypropylene, preferably has a hardness in the range of 30 to 85 durometers, preferably 70 durometers, according to the Shore D scale. The soft plastic portions of the channel seal are formed from a softer more resilient TPE having a hardness in the range of 40 to 90 durometers, preferably 70 durometers according to the Shore A scale.

Such hard and soft TPEs are readily processed and fabricated, for example, by extrusion or molding and are particularly amenable to coextrusion and simultaneous molding of two or more TPEs of different durometer values. The TPEs are readily colored to match the vehicle either by incorporating pigment or by painting. Directly paintable TPE's have a high surface energy material blended into the base polymer to accept water based paints without any pretreatment. The hard TPEs can be made with a high gloss finish. For example, a Class A finish or a gloss of at least 60 numerical value when measured at a 60° angle with a gloss meter is readily obtained which is substantially higher than can be obtained with an EPDM rubber seal.

In another aspect of the invention there is provided a method for forming the resilient channel insert with a belt-line extension. The channel insert is formed by extruding an elastomer, preferably an EPDM rubber, in a generally flat configuration. The extruded insert is cut in strips which are dice-cut or slit in three places so that each strip will conform to the bends in the glass run channel carrier. A strip is split at each end and torn back along a pre-determined length of the line of weakness to form a belt-line extension and a channel run extension at each end of the length of insert. The distal ends of the lengths of the belt-line extensions are then butt jointed together to form a one-piece window channel insert and belt-line extension. The interfaces between the belt-line extensions and the channel run extensions are then molded with rubber fillets, preferably uncured rubber, so that on further curing the triangular-shaped fillets of vulcanized rubber are bonded to the belt-line and channel run extensions of the insert.

The window channel insert is then folded and snapped into the U-shaped flush glass channel seal to mechanically secure them together, for example, by interlocking the projections of the insert with the extensions of the channel seal. In some applications a tape, such as urethane-foam tape is placed between the insert and the channel to improve the sealing action. Similarly, the belt-line extension is pressed into the groove of the belt-line carrier to secure them together.

The door and window run channel seal 80, for example as described in FIG. 6, is obtained by coextruding the thermoplastic elastomers of different durometer values to form a substantially rigid, channel seal in a one-piece generally U-shaped configuration. The extrusion temperature is generally between about 150° to 250° C., preferably about 200° C. In some applications the extrusion is further subjected to heat forming to conform to the shape of the vehicle body. The first post extrusion operation is forming the arches on the end of the extrusion. These curves will match the curvatures of the doors and glass. The arches are bent on each end of the part, allowing a precise fit with the pillars of the door. After the arches are formed, the corners are formed. The belt line channel seal carrier 82, for example as described in FIG. 7, is formed in the same manner.

Alternatively the window run channel seal 80 and the belt-line channel seal carrier 82, are obtained by thermally molding the thermoplastic elastomers of different durometer values. The molding temperature is generally between about 150° to 250° C., preferably about 200° C.

The one-piece construction of the window run channel insert with a belt-line extension eliminates gaps between a window seal and a separate belt seal which are a source of leaks ant permit excessive window rattle and allow road noise to penetrate the interior of the vehicle. When the combination window channel seal and belt line seal extension of the present invention is used in conjunction with channel seal and belt-line carrier portions formed from substantially rigid thermoplastic material that does not require a wire carrier the completed assembly is lighter than the all-rubber assemblies used in the past and can be color matched with the interior.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A method for forming a combination window channel seal insert with a belt-line seal extension, comprising:

extruding a generally flat, resilient insert defined by a base having first and second ends, a first leg attached to the first end of the base, a first sealing lip attached to the first leg, a second leg attached to the second end of the base, a line of weakness in the base adjacent the second leg for permitting the second leg to be separated from the base along the line of weakness, the second leg including an anchoring head adjacent the line of weakness, and a second sealing lip attached to the second leg;

cutting the extruded insert into a strip of a selected length;

tearing away a first length of the second leg from a first portion of the base starting at an end of the strip;

tearing away a second length of the second leg from a second portion of the base starting at an opposite end of the strip; and joining a distal end of the first length to a distal end of the second length to form the belt-line extension of the insert.

2. The method of claim 1, further comprising molding a generally triangular-shaped fillet of rubber between each of the first and second portions of the base and the belt-line extension at an intersection between each of the first and second portions of the base and the belt-line extension.

3. The method of claim 2, further comprising curing the combination.

* * * * *